(12) United States Patent
Warnery et al.

(10) Patent No.: US 9,309,802 B2
(45) Date of Patent: *Apr. 12, 2016

(54) CONTROL VALVE UNIT FOR A LIQUID CIRCUIT

(71) Applicant: MANN+HUMMEL GMBH, Ludwigsburg (DE)

(72) Inventors: Stéphane Warnery, Rennes (FR); Pascal Noiseau, Saint Ouen des Toits (FR); Mickael Cormerais, Vallon-sur-Geé (FR)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/257,264

(22) Filed: Apr. 21, 2014

(65) Prior Publication Data

US 2014/0224361 A1     Aug. 14, 2014

Related U.S. Application Data

(63) Continuation of application No. 13/549,448, filed on Jul. 14, 2012, now Pat. No. 8,701,603, which is a continuation of application No. PCT/EP2011/050458, filed on Jan. 14, 2011.

(30) Foreign Application Priority Data

Jan. 14, 2010   (FR) ...................................... 1050238

(51) Int. Cl.
*F01P 7/14*     (2006.01)
*F01P 1/08*     (2006.01)
(Continued)

(52) U.S. Cl.
CPC . *F01P 7/16* (2013.01); *F01P 7/167* (2013.01); *F01P 11/16* (2013.01); *F16K 31/52416* (2013.01); *F01P 2007/143* (2013.01); *F01P 2007/146* (2013.01); *Y10T 137/7737* (2015.04); *Y10T 137/8158* (2015.04);
(Continued)

(58) Field of Classification Search
CPC . F16K 11/044; F16K 11/048; F16K 11/0704; F16K 11/10; F16K 17/105; F16K 21/04; F16K 31/007; F16K 31/008; F16K 31/061; F16K 31/0624; F16K 31/0675; F16K 31/52416
See application file for complete search history.

(56) References Cited

U.S. PATENT DOCUMENTS 2,301,876 A * 11/1942 Hurlburt ................. F16K 31/10
                                                                 137/556
2,407,789 A *  9/1946 Koehler .......................... 251/85
(Continued)

*Primary Examiner* — Lindsay Low
*Assistant Examiner* — Tea Holbrook
(74) *Attorney, Agent, or Firm* — James Hasselbeck

(57) ABSTRACT

A control valve unit for a liquid circuit of an internal combustion engine, includes a valve housing (1) having at least one inlet opening (2) or outlet opening (2') and at least two outlet openings (31, 32, 33) or inlet openings (31', 32', 33') and at least two closing elements (41, 42, 43) actuated by a control device (22). The closing elements selectively open or close an associated outlet or inlet opening. The closing elements may be continuously adjusted between maximum open and closed positions. The control device (22) includes at least one displaceable or rotatable cam (6) and includes at least two cam tracks (71, 72, 73), each of which is assigned to a closing element (41, 42, 43) and acts on at least one driving pin (11) that is in contact with said closing element (41, 42, 43). The cams (6) are adjusted by an actuator (8).

13 Claims, 5 Drawing Sheets

(51) Int. Cl.
*F01P 5/14* (2006.01)
*F16K 31/44* (2006.01)
*E03B 1/00* (2006.01)
*F16K 11/14* (2006.01)
*F01P 7/16* (2006.01)
*F01P 11/16* (2006.01)
*F16K 31/524* (2006.01)

(52) U.S. Cl.
CPC ... *Y10T 137/8242* (2015.04); *Y10T 137/86493* (2015.04); *Y10T 137/87024* (2015.04); *Y10T 137/87064* (2015.04); *Y10T 137/87692* (2015.04); *Y10T 137/87748* (2015.04)

(56) References Cited

U.S. PATENT DOCUMENTS

| | | | | |
|---|---|---|---|---|
| 4,854,273 A * | 8/1989 | Uesugi | ........ | F01L 1/267 123/90.16 |
| 5,257,014 A * | 10/1993 | Zimmermann | ........ | G01B 7/02 137/554 |
| 5,671,773 A * | 9/1997 | Park | ........ | F24D 3/10 137/386 |
| 6,213,147 B1 * | 4/2001 | Gramann | ........ | F01L 9/04 123/90.11 |
| 6,343,573 B1 * | 2/2002 | Takahashi | ........ | F01P 7/167 123/41.08 |
| 6,837,193 B2 * | 1/2005 | Kobayashi | ........ | F01P 7/167 123/41.02 |
| 6,932,034 B2 * | 8/2005 | Machida | ........ | F01L 13/0026 123/90.15 |
| 6,951,198 B1 * | 10/2005 | Megli | ........ | F02D 13/04 123/321 |
| 7,044,444 B2 * | 5/2006 | Haubold | ........ | F15B 15/10 137/554 |
| 7,509,948 B1 * | 3/2009 | DePayva et al. | ........ | 123/506 |
| 7,882,852 B2 * | 2/2011 | Coakley | ........ | G01D 5/145 137/552 |
| 8,701,603 B2 * | 4/2014 | Warnery et al. | ........ | 123/41.08 |
| 2005/0247350 A1 * | 11/2005 | Coakley | ........ | G01D 5/145 137/554 |
| 2006/0131445 A1 * | 6/2006 | Petrovic | ........ | B05B 1/1609 239/443 |
| 2009/0039301 A1 * | 2/2009 | Midorikawa | ........ | F01L 1/3442 251/129.15 |
| 2012/0279462 A1 * | 11/2012 | Warnery et al. | ........ | 123/41.08 |

* cited by examiner

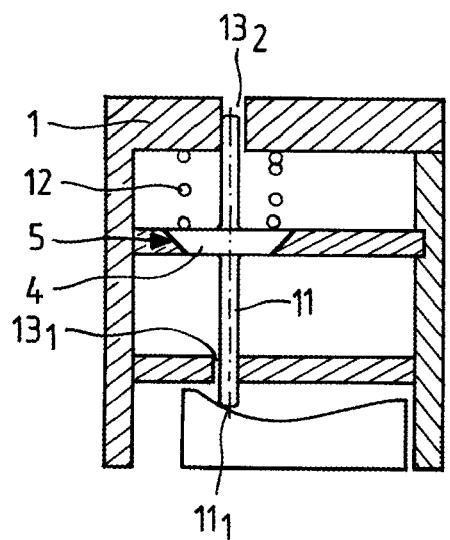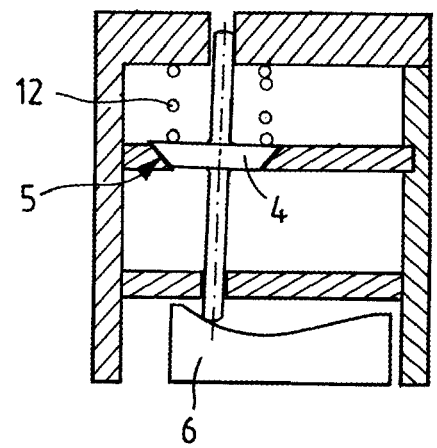
Fig.4a    Fig.4b
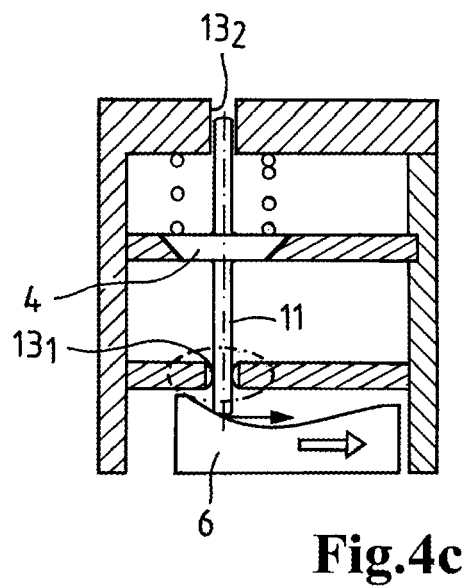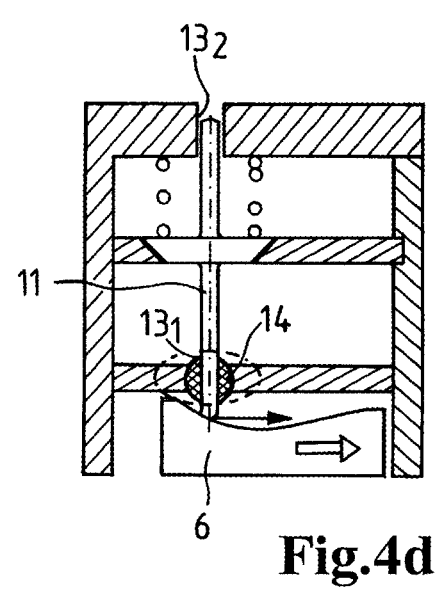
Fig.4c    Fig.4d

CONTROL VALVE UNIT FOR A LIQUID CIRCUIT

CROSS REFERENCE TO RELATED APPLICATIONS

This application is a continuation of U.S. application Ser. No. 13/549,448, filed Jul. 14, 2012. U.S. patent application Ser. No. 13/549,448 is US bypass continuation of international patent application no. PCT/EP2011/050458 filed Jan. 14, 2011 designating the United States of America, the entire disclosure of which is incorporated herein by reference. Priority is claimed based on French patent application no. 1050238 filed Jan. 14, 2010.

TECHNICAL FIELD

This disclosure relates generally to a control valve unit for a liquid circuit of an internal combustion engine, in particular for a cooling liquid circuit of an internal combustion engine.

Such a control valve unit comprises, on the one hand, a valve housing of one or several parts, provided with an inlet opening that is connected to an inflow line as well as at least two outlet openings that are each connected to an outlet opening and, on the other hand, comprises at least two closing elements that are actuated by means of control devices in order to selectively open or close a correlated outlet opening according to a rule that has been determined beforehand or to change its flow cross-section when an operating parameter or a characteristic field of various operating parameters reaches the predetermined values.

Each closing element is adjustable continuously between an open position in which it permits flow of liquid to the correlated outlet opening and a closed position in which it is resting on a seat in order to block this flow.

BACKGROUND OF THE INVENTION

Conventional internal combustion engines are provided with thermostat valves that generally have two or three channels with which the flow of the cooling liquid can be controlled, in particular in order to bring the internal combustion engine more quickly to operating temperature in that the flow rate of this liquid is slowed or prevented as soon as its temperature drops below a preadjusted threshold.

Such thermostat valves, as disclosed, for example, in DE 3705232 C2, are comprised usually of wax thermostatic elements in a single passage or dual passage configuration. A wax thermostatic element is comprised of a holder, of a valve seat, a closing element and a small wax pellet that is its main component. In the cold state, the closing element is seated on a seat and the cooling liquid does not flow about the closing element. When the temperature increases, the wax will expand and exert pressure on the closing element that lifts off its seat and allows the cooling liquid to flow past the closing element. As a result of their structure, the wax thermostat has a large thermal inertia thus enabling only a passive control action.

Accordingly, a first disadvantage of these thermostatic elements is their long response time which has the result that the temperature threshold of the cooling liquid that causes opening of the closing element must be low.

In order to avoid thermal problems that are correlated with a transient load of the motor, it must be ensured that the wax thermostatic element will open before the cooling liquid has reached a temperature that is too high.

As a result of fluctuations of the opening temperature threshold, the wax thermostatic element cannot provide a satisfactorily precise control action so that an optimization of the motor performance with respect to heat management is not possible with such thermostatic elements.

Up to now, the thermostats have controlled the flow through the motor radiator and an additional bypass that enables to bypass the motor radiator while in other flow passages the cooling medium flows constantly (for example, for heating the passenger compartment). This branch design slows the increase of the motor temperature and has a disadvantageous effect on motor performance and pollutant emissions during the starting phase of the engine.

For eliminating these disadvantages, it has been proposed recently to add to the wax thermostatic element an electric resistor in order to heat the wax and to thus accelerate opening of the closing element.

Such an addition increases the temperature threshold of the cooling liquid and thus the effectiveness of the control action; however, the response time of the thermostat is relatively long and the precision of the control action is in this far unsatisfactory in that the electric resistor represents only assistance for opening the closing element but not for its closure, and the wax still exhibits a strong thermal inertia.

It is also known to furnish the liquid circuits with control valves instead of with the wax thermostatic elements, in particular with control valves that are provided with rotating or linear closing elements.

Such valves must however be provided with dynamic seals, for example, shaft sealing rings, that give rise to problems in respect to management of frictional forces between valve shaft and valve receiving bore, which problems require oversizing of the actuator which then increases the required energy for the control action and leads to oversizing of the closing element, which increases the response time of the closing element.

SUMMARY OF THE INVENTION

Subject matter of the present invention is to propose a control valve unit for a liquid circuit of an internal combustion engine, in particular for a cooling liquid in an internal combustion engine, in order to eliminate these disadvantages, in particular with a very short switching time for an active control of opening, closing and adjusting of the closing elements and with the possibility of controlling the opening and closing action of more than two outflow lines and to control in this way the flows for thermal regulation through all outflow lines, in particular during the starting phase of the engine, in order to accelerate heating of the engine, decrease emissions, and increase the motor performance.

In this way, the thermal capacity of the liquid is used better and a distribution of the liquid flow between the various component groups of the motor to be temperature-controlled is governed.

A further object of the invention is to propose a control valve unit of the aforementioned type that is characterized by a particularly simple and compact configuration but, despite of this, thanks to the lack of translatory or rotatory seals at the closing elements, exhibits no problems with regard to management of frictional forces.

For this purpose, the invention concerns a control valve unit for a liquid circuit of an internal combustion engine, in particular for a cooling liquid in an internal combustion engine, that, on the one hand, has a valve housing with at least one inlet opening that is connected with at least one inflow line, as well as with at least two outlet openings that each are connected to an outlet line and, on the other hand, has at least two closing elements that are actuated by means of a control device in order to selectively open or close the correlated outlet openings according to a predetermined rule when an operating parameter reaches the predetermined values, wherein each of these closing elements can be adjusted continuously between a maximum open position, in which the liquid can flow into the correlated outflow line, and a closed position, in which it is forced onto a seat and in this way blocks the flow.

The control valve unit can be designed comparably such that the fluid flows through at least two inlet openings into the control valve unit and closing elements control the inflow and the fluid flows through an outlet opening out of the control valve unit.

According to the invention, such a valve unit is comprised of at least one slideable or rotatable cam or a rotating cam disk. The cam or cam disk is furnished with at least two control paths that each have correlated therewith a closing element and each act on at least one follower pin or valve shaft fixedly connected to said closing element.

According to the invention, movement of the cam is controlled by at least one actuator that can be connected, directly or by means of an evaluation or control electronic device, with one or several sensors reacting sensitively to the operating parameters, for example, in the form of a temperature sensor and/or a position sensor.

Such a sensor transmits a signal to the evaluation or control electronic device or the control actuator that, as a response thereto, adjusts the cam and thus the closing elements in order to open or close the outlet openings when the operating parameter has reached the predetermined values. The adjustment of the closing elements can also be realized continuously between the end positions as a response to continuously changing operating parameters.

The control actuator for the displacement or rotation of the cam or the control disk and thus for opening and closing the closing elements can be of any type without thereby leaving the boundary of the invention: an actuator that is acting electrically, pneumatically, hydraulically or according to a different functional principle.

Concerning the closing elements, they are subject in general to a linear movement in axial or radial direction and the follower elements can be constantly in single or double contact with the correlated control circuit of the cam or the control disk.

A significant advantage of the control valve unit according to the invention resides in that in the closed position it guarantees a fluid-tight sealing action without internal dynamic seals, for example, a shaft sealing ring, between the closing elements and the outlet lines. Only between the shaft provided between actuator and cam and the valve housing a dynamic seal is installed for sealing the liquid-conducting inner side relative to the environment. At this location, the frictional forces are however minimal and can be easily managed.

Depending on the seal tightness required from the closed valve position, the adjusting elements can be provided with simple seals. According to one embodiment of the invention, for example, each closing device can be provided with a mounted seal (O-ring seal, shaped seal) or an elastic sealing compound that is directly molded onto the closing elements.

An alternative embodiment is sealing at the stationary valve seat on the valve housing by molding an elastic sealing compound thereon or by mounting a seal on this valve seat.

As a material for the seal, in particular ethylene-propylene-diene rubber (EPDM), hydrogenated acrylic nitrile butadiene rubber (HNBR) or silicone are suitable.

A further significant advantage of the control valve unit according to the invention resides in that the opening and closing conditions of the outlet openings can be modified easily by changing the control path of the cam or of the cam disk. Also, the shape of the valve seat or the shape of the valve itself can be varied. In this way, adaptations, for example, to different motor variants, are possible in a simple way without the control valve unit itself having to be modified. Also, the application of the control valve unit during the development phase of an internal combustion engine is facilitated.

The dynamic course of the change of the flow cross-section can be optimized in accordance with the thermal requirements of the internal combustion engine during adjustment of the closing device when opening/closing each area, which is difficult in particular in case of conventional linear or rotatable closing elements.

According to a preferred feature of the invention, the shape of the closing elements below the valve seat can have a curved shape, for example, a bead, in order to achieve a progressive control course of the system. This effect can also be realized by appropriate geometric configuration of the valve seat relative to the closing element. By the design of the curvature(s) of the valve body, the dynamic cross-sectional change can be designed as desired.

According to an advantageous feature of the invention, the control valve is designed such that the force of the static and dynamic pressures, exerted on the closing elements by the liquid flowing through, have the tendency to force these elements into their closed position.

With such a configuration the drive forces can be reduced to a large extent; this means that the installation size and the energy consumption of the actuator can be reduced. At the same time, the reduction ratio and therefore the response time of the valve can be reduced.

According to a further advantageous configuration of the invention, each of the closing elements interacts with a restoring spring that is suitable to hold it by force against the seat in the closed position.

Inasmuch as the closing elements have a tendency to be forced into their closed position under the effect of the pressure acting on them and created by the liquid flowing through, the restoring springs must not overcome this pressure but they act in the same direction as the pressure in order to guarantee the sealing action in the closed position.

According to the invention, the restoring springs also have the function of facilitating the guiding action of the follower pins and increasing the acceptable manufacturing tolerances.

In particular, and in accordance with another particularly advantageous feature of the invention, the follower pin of each closing element is mounted on both sides of this element in two guide bearings that are fixedly connected to the housing, wherein at least one of these guide bearings is provided with radial play in order to enable the correlated closing element to compensate alignment deviations or orientation errors of the seat that, in the closed position, may cause leakage at the sealing location.

Alternatively, each of the guide bearings of the follower pins can have play.

As a possible variant, such play can be provided also at the guide bearing that is farthest removed from the cam, i.e., positioned so as to be opposite to the cam, relative to the closing element.

According to this variant, an annular contact surface between the follower pins and the guide bearing positioned closest to the cam or follower pins that are provided with a spherical or semi-spherical bearing enable a compensation of alignment deviations of the follower pins, caused by tangential forces resulting from the cam profile or the orientation errors of the seat of the closing elements.

For compensating tolerances in the control valve housing, in an advantageous embodiment the closing elements may be of a two-part configuration such that in the area of the follower pin or directly in the area of the sealing location a joint is arranged which transmits the pressure forces from the cam disk onto the sealing location or allows for angular deviations. An advantageous embodiment of such a joint is a semi-spherical end of a part of the follower pin that is supported in socket-shaped counter member.

In an alternative embodiment of the invention, the follower pin of the closing device can be reinforced by a rigid insertion part. In particular in case of a closing device or a follower pin made of plastic material, the component can be reinforced with a rigid insertion part, preferably made of a material that is resistant to creep and is shape-staple even under thermal effects.

According to the invention, the sensors and the actuator can have a common electrical connecting technology.

The type of connection between the actuator and the cam can be also of any type without thereby leaving the boundaries of the invention.

According to a further feature of the invention, the cam is comprised of a pinion or a linear toothed rack. The actuator is connected therewith by means of a worm drive so that the axis of the actuator extends tangentially to the cam; this provides great freedom for positioning this element.

Depending on the environmental conditions or operating state of the internal combustion engine, it may be advantageous, in comparison to a simple rigid cam control, to have a variable control of the closing devices. In an alternative embodiment of the invention, the cams have one or several activation methods that act on one or several cam paths (for the rotational cams) or linear sectors (for translatory adjustment).

According to another embodiment of the invention, one or several paths of the cam are adjustable relative to each other in order to be able to affect the position of one closing device in that the latter controls the other closing devices based on the cam path that has been determined beforehand.

According to another embodiment of the invention, one or several paths of the cam of the control device can be displaced relative to each other in order to adjust the control device to special operating conditions. One or several cams or control paths can be decoupled individually so that only some of the closing elements are activated or the control behavior of the individual closing elements relative to the cam is modified.

In a further embodiment, the cam disk or the linear cam can be adjusted in the direction of the movement direction of the closing elements so that the adjustment of the closing elements relative to each other is not changed but the gap height or the flow cross-section between closing elements and valve seat. This can be realized by means of a second actuator (electric, magnetic, but also with a wax thermostatic element).

These different embodiments are particularly advantageous when a partial flow of the total circuit is to be adjusted with regard to special environmental or operating conditions. For example, the operating type for hot countries can be adjusted such that motor cooling is preferred and heating of the passenger compartment is reduced. On the other hand, an operating type for cold countries can be applied that ensures preferred heating of the passenger compartment.

In a further embodiment, it is provided to use a position sensor for detection of the actual position of the cams A Hall sensor that is mounted on the housing provides a signal to the control electronic device that enables readjustment of the cams The Hall sensor interacts with a magnet that is mounted on the cam disk or a linearly adjustable cam or the drive shaft or another suitable location. In this way, a contactless detection of the position of the closing elements is possible from the interior that is flowed through by the liquid without passing conductors through the housing wall to the exterior of the housing.

A preferred embodiment of the invention is provided in the configuration of a clearance fit between cam and valve seat in the closed valve position. This play provides a discontinuity in the force expenditure that is required for opening the closing devices. Accordingly, the invention enables, by analysis of the signal of the power consumption of the valve control, the determination of the degree of opening of the closing devices. The invention enables an adaptation of the adjustment of the begin or a readjustment of the continuously adjustable opening action of the closing devices as a self-learning system across the product lifetime. This adaptation will preferably be realized after shutting down the engine so that the pressure in the system will not have an effect on the analysis. The adaptation is realized by at least one movement of the system for the entire stroke or a portion of the stroke. It can be integrated into the electronic device of the motor control unit or into the internal electronic device of the actuator. It can make by analysis of the power consumption of the actuator, by analysis of the PWM signal (PWM=pulse width modulation) or by any other method of analysis of the signal.

When the control valve unit is used together with a temperature sensor, the latter can be advantageously arranged between control valve and engine block or between control valve and cooling liquid pump. In order to receive also a signal in regard to the cooling water temperature during the closed position of the closing devices, in an advantageous embodiment a control is provided that is integrated into the motor control unit or into an intelligent control unit that temporally opens the closing device in order to supply liquid from the cooling circuit to the sensor.

Alternatively, a bypass channel is advantageous through which permanently liquid is guided past the temperature sensor in order to provide a continuous temperature signal.

In order to avoid damage to the internal combustion engine during an improbable, but not entirely impossible, malfunction of the control valve unit or of the internal combustion engine, a closing element with a fail-safe function may be provided that in case of a malfunction assumes a predetermined closed or open position.

For the configuration of the housing of the control valve unit as well as of the cams and the closing elements, different suitable materials are conceivable, in particular plastic material. Preferred materials are PA66 and/or PPS that may contain fillers and stabilizers for improving the media resistance and the shape stability.

The housing of the control valve unit can be combined of several housing parts that are preferably produced by injection molding of plastic material. When using plastic material as a housing material, the housing part are preferably welded to a complete housing in particular by thermocompression welding or by hot gas welding.

The control valve unit according to the invention can be arranged upstream as well as downstream of the internal combustion engine. In the described embodiments, the control valve is positioned downstream of the internal combustion engine.

In an alternative application, the control valve unit according to the invention can also be used as a valve unit for controlling other liquid circuits of an internal combustion engine, for example, for controlling the lubricant oil circuit.

In a further application, the control valve unit according to the invention can be a control valve unit for a fluid circuit for heat regulation of a fuel cell unit that also falls under the definition of an internal combustion engine.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIGS. 4*a* to 4*d* are schematics showing different installation situations of a closing element;

Same objects are identified with same reference characters in all Figures.

Figure 1:
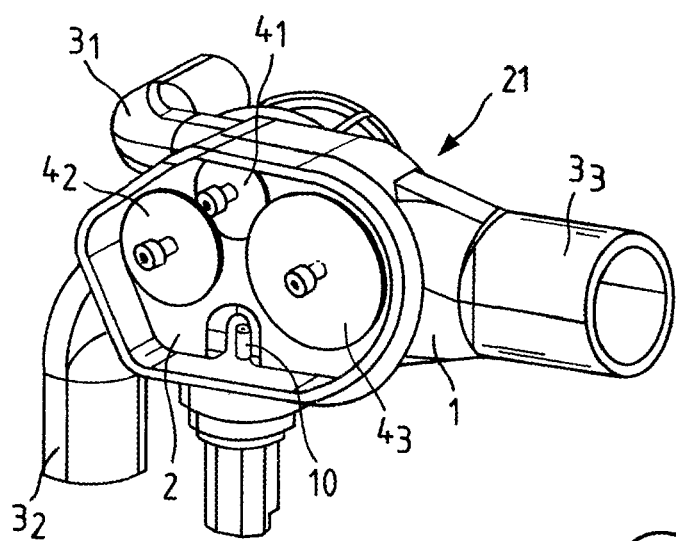
FIG. 1 is a perspective view of a control valve unit according to the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a control valve unit for a liquid circuit of an internal combustion engine. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In the embodiment according to FIG. 1 the control valve unit (21) comprises a housing 1, manufactured of three parts, that comprises a schematically illustrated inlet opening 2 as well as three outlet openings 31, 32, 33 each connected to an outflow line for this liquid. The inlet opening 2 can be directly connected by a flange to a corresponding counter flange on the engine block (not illustrated) in a seal-tight fashion so that a simply designed housing 1 of the control valve unit can be realized and a separate connecting line from housing 1 to engine block is not needed.

Figure 2:
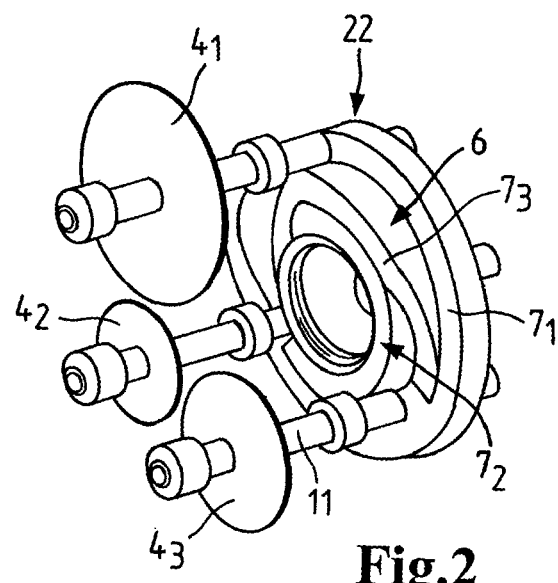
FIG. 2 is a perspective exploded view of the control device with the correlated closing elements.

The outlet openings 31, 32, 33 can each be closed by a circular closing element 41, 42, 43 illustrated in more detail in FIGS. 2 and 5.

The closing elements 41, 42, 43 are adjustable between an open position, in which the liquid flows through the outlet openings 31, 32, 33 into the correlated outlet lines, and a closed position, in which they are resting on a correlated seat 5 that is fixedly connected to the housing 1 (illustrated in FIGS. 4*a* to 4*d*) in order to influence this flow. Upstream of the closing elements 41, 42, 43, a sensor 10 is arranged such that it is in contact with the liquid.

FIG. 2 shows the control device 22 in an embodiment as a cam disk with the three control paths 71, 72, 73. The control device 22 controls the continuous adjustment of the closing elements 41, 42, 43 between an open position and a closed position through a rotatable cam (6) that is provided with three control paths 71, 72, 73 that each are correlated with a closing element 41, 42, 43.

Figure 3:
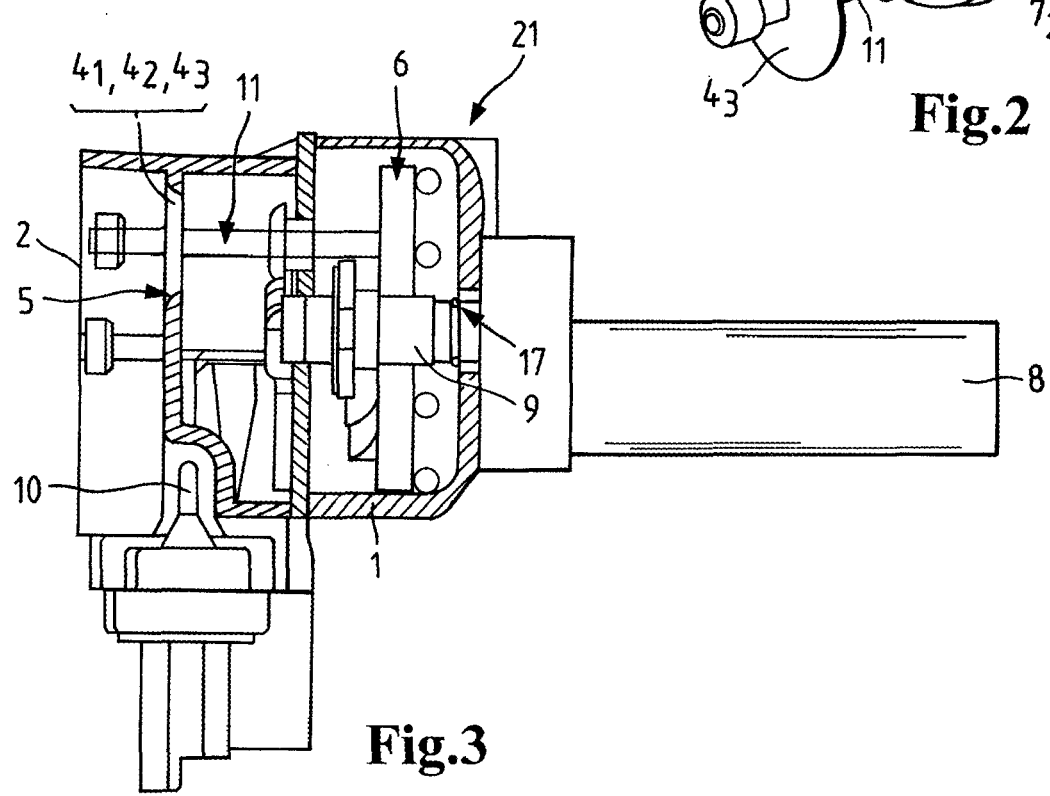
FIG. 3 shows a longitudinal cross-section of the control valve unit.

As illustrated in FIG. 3, the rotation of the cam 6 is controlled by an actuator 8 that acts with a gear wheel set on a drive shaft 9 so that the drive shaft 9 and therefore the cam 6 rotate at a preadjusted speed. The shaft sealing ring 17 between housing 1 and the drive shaft 9 is the only dynamic seal of the control valve unit. The actuator 8 is connected by means of a non-illustrated control electronic device with a temperature sensor 10 that constantly transmits a meaningful signal in regard to the temperature value of the liquid that enters through the inlet opening 2. As a response to this signal the actuator 8 controls the rotation of the cam 6 and therefore the position of the closing elements 41, 42, 43.

More precisely expressed and according to FIG. 2, each of the closing elements 41, 42, 43 is connected with a follower pin (11). One end of the follower pin 11 is continuously in contact with the correlated control path 71, 72, 73 of the cam 6 in order to control the adjustment of the closing elements 41, 42, 43.

According to FIGS. 4a to 4d, each of the closing elements 4 is tensioned with a spring 12 that is suitable to hold it non-positively against its seat 5 in the closed position in order to guarantee in this area the sealing action to close off flow through the seat. The follower pin 11 of each of the closing elements 41, 42, 43 is secured on both sides of this element in two guide bearings 131, 132 that are fixedly connected to the housing 1.

According to FIGS. 4a and 4b, side-to-side radial play is provided for each of the guide bearings 131, 132 of the follower pins 11. As illustrated in FIG. 4a, such a play of the spring 12 enables compensation of an alignment deviation of the follower pins 11 relative to the actuating direction. As illustrated in FIG. 4b, such a play of the spring 12 enables also compensation of an angular error of the seat 5 of the closing elements 41, 42, 43 or an angular deviation between closing elements 41, 42, 43 and follower pin 11.

According to FIGS. 4c and 4d, play is provided only at the guide bearing 132 that is farthest removed from the cam 6, i.e., positioned opposite the cam relative to the closing elements 4. FIG. 4c shows an annular linear contact between the follower pin 11 and the guide bearings 131 that is closest to the cam 6. According to FIG. 4d, the follower pin 11 is provided with a spherical bearing 14 at the guide bearing 131 that is closest to the cam 6. These configurations enable also compensation of an alignment deviation of the follower pin 11 or a bad orientation of the seat 5 of a closing element 41, 42, 43.

Figure 5A:
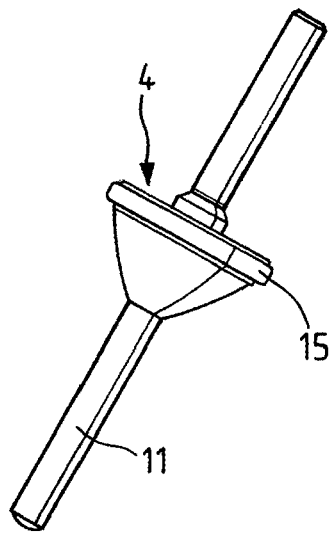
FIGS. 5*a* to 5*d* disclose different embodiments of the closing elements.
Figure 5B:
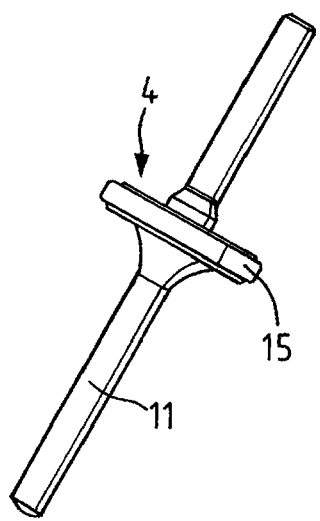
Figure 5C:
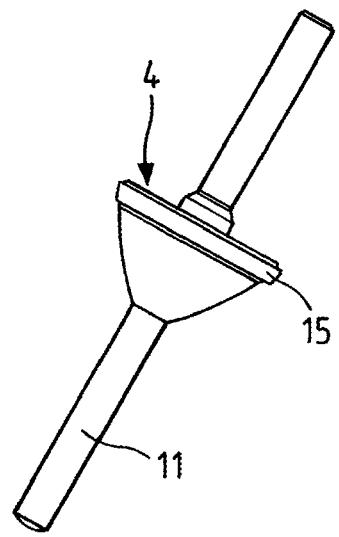
Figure 5D:
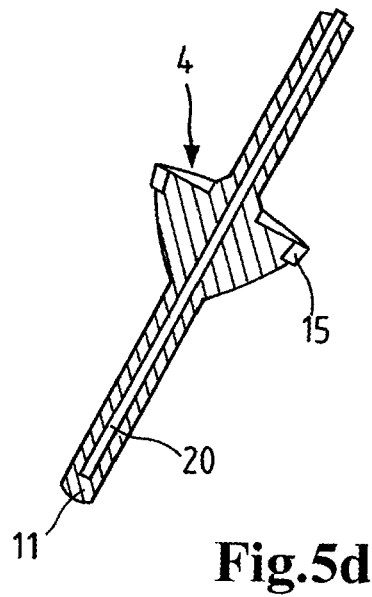

FIGS. 5a to 5d show alternative embodiments of the closing elements 41, 42, 43 (represented by 4). For optimizing the course of the cross-sectional change during the adjustment of the closing elements, the closing device valve body can have a curved shape below the valve seat 4 in order to achieve a progressive control action. Depending on the desired control action, the curvature can be concave (FIG. 5b) or convex (FIGS. 5a, 5c) or can have a stepped shape. In order to improve the sealing action of the closing elements 41, 42, 43 relative to the valve seat 5 at the housing, a seal 15 can be provided on the closing element 41, 42, 43 or on the valve seat 5 at the housing. For this purpose, simple shaped seals or O-rings (FIGS. 5a, 5b) are comparably suitable. Alternatively, a sealing material can be molded directly onto the closing element 41, 42, 43 or the valve seat 5 at the housing, as illustrated in FIG. 5c.

For reinforcing the closing device, an insertion part 20 is suitable that is surrounded by the material of the follower pin 11. The insertion part can be for example made of metal that is embedded in the plastic material of the follower pin 11 by injection molding of the plastic material.

The different embodiments of the closing device according to FIGS. 5a to 5d can of course be combined in any suitable way with each other.

Figure 6:
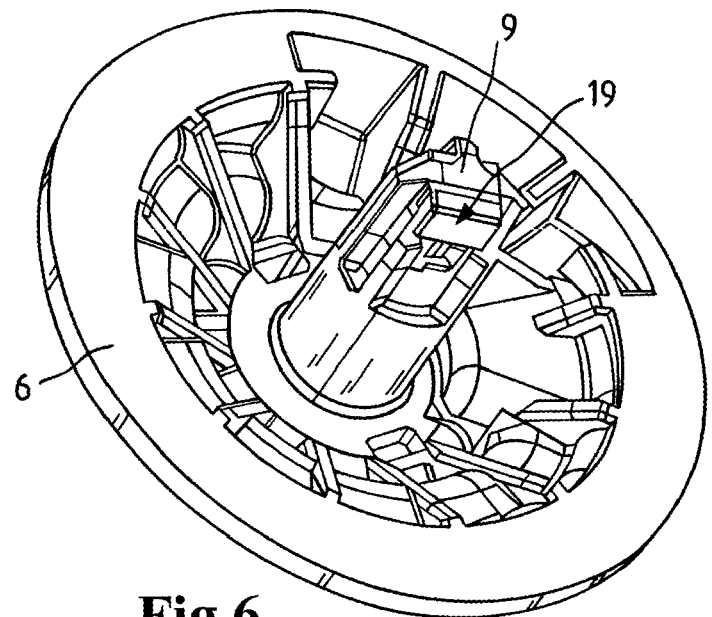
FIG. 6 shows a cam disk for adjusting the closing elements in a perspective individual illustration.

In FIG. 6, a view of a cam disk 6 with the drive shaft 9 is illustrated. For positional recognition of the cam disk on the drive shaft 9 a magnet 19 is mounted that, interacting with a Hall sensor 18 (principle illustration in FIG. 8) mounted on the housing 1, provides a feedback signal of the position of the rotating cam 6 to an electronic device. The cam disk 6 is embodied as an injection molded plastic part.

Figure 7:
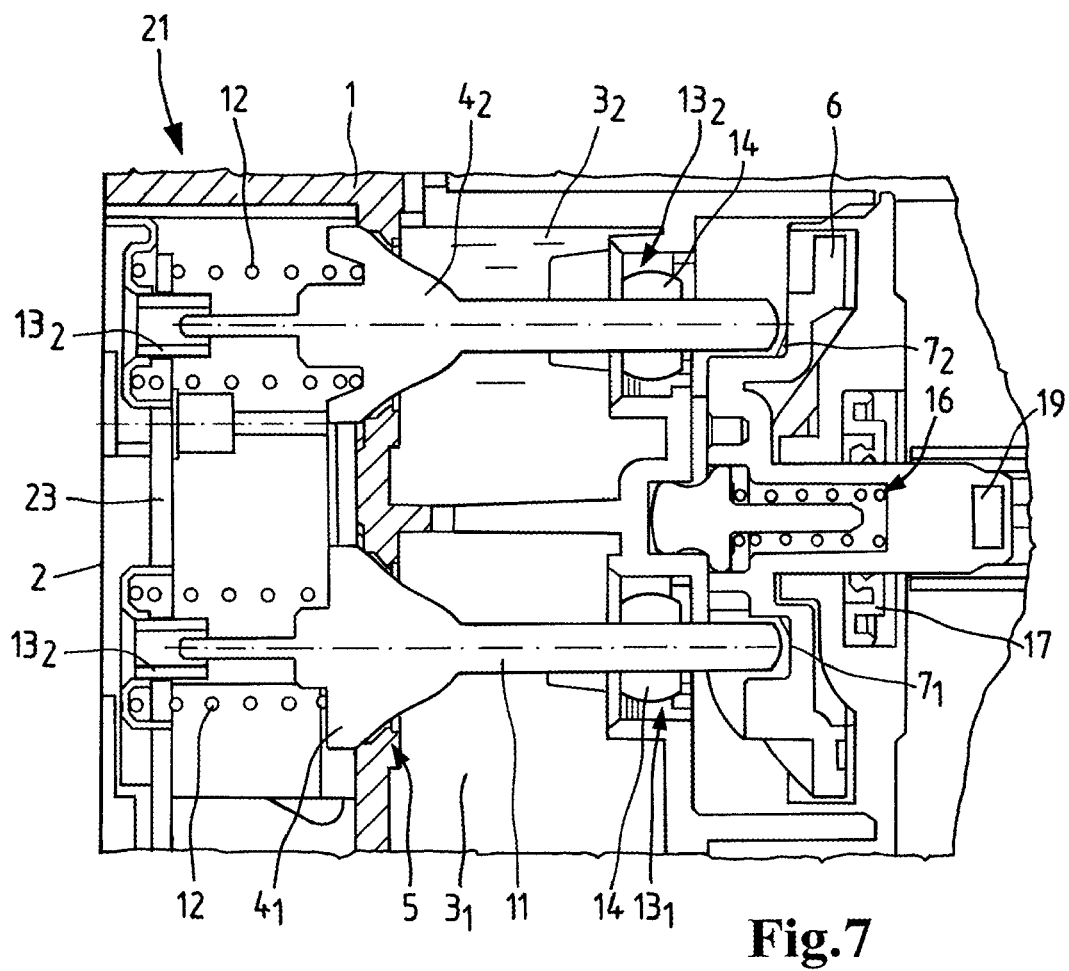
FIG. 7 shows a section of the adjusting unit of the control valve unit.

FIG. 7 shows a section view of the control valve unit 21 along the adjusting direction of the closing elements 41, 42, 43. The liquid flows through the inlet opening 2 into the control valve unit 21, passes a liquid-permeable frame 23 that receives the bearings 132 of the closing elements 41, 42, 43 in the direction of the closing elements 41, 42, 43. The closing elements 41, 42, 43 are received with their ends in a bearing 131, 132 and, in the open position, are pressed with a spring 12 through the follower pin 11 against the cam disk 6 and, when the valve is closed, against the valve seat 5 at the housing. The cam disk 6 is forced with a spring 16 against the bearing of the cam disk 6 in order to compensate a possibly existing axial play. The shaft sealing ring 17 seals the liquid-conducting interior outwardly relative to the exterior.

Figure 8:
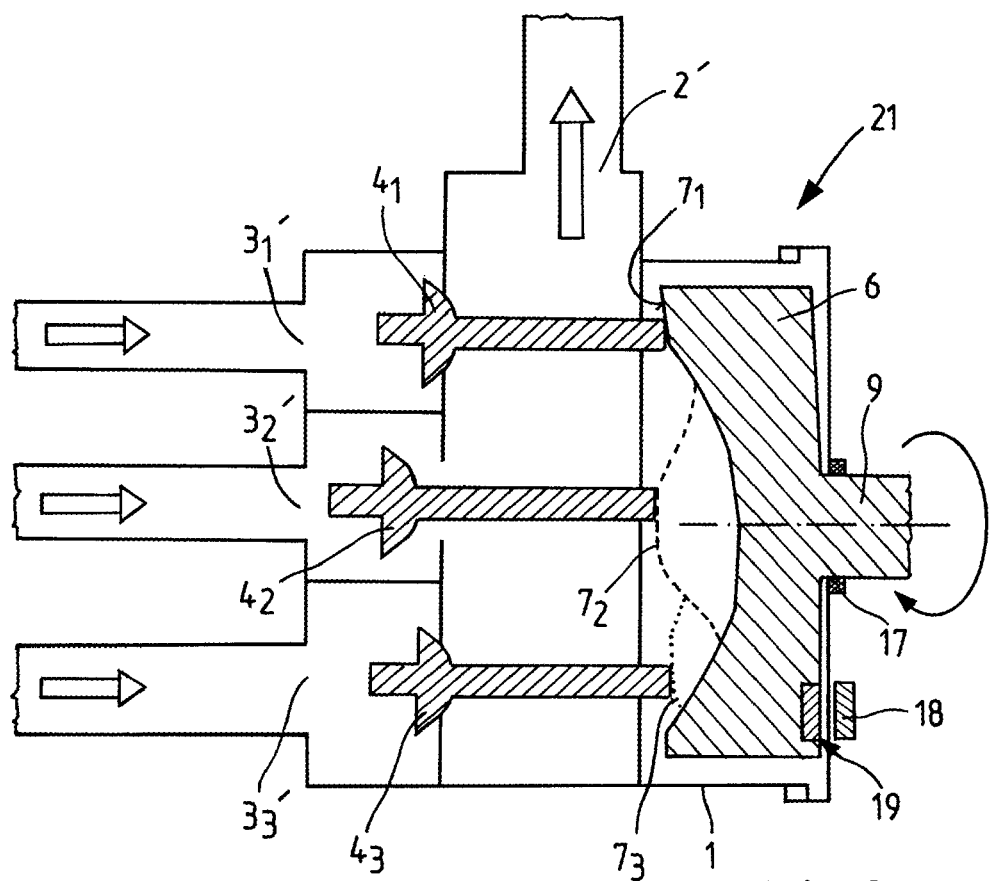
FIG. 8 shows schematically an embodiment of the control valve unit with three inlet openings and a common outlet opening.

In FIG. 8 schematically an embodiment of the control valve unit according to the invention is illustrated that comprises at least two inlets 31', 32', 33' and an outlet opening 2'. Closing elements 41, 42, 43 serve for control of the inflow of a liquid through the different inlet openings 31', 32', 33' toward the common outlet opening 2'. The constructive configuration of this embodiment can be realized in accordance with a combination of the already described embodiments.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A control valve unit for controlling fluid flow in a liquid circuit for an internal combustion engine, comprising:
   a valve housing, including
      at least one first inlet opening or first outlet opening for the fluid flow;
      at least two second outlet openings or at least two second inlet openings;
   at least two closing elements arranged in the valve housing, axially movable and operable to close off the fluid flow between said first opening and said second openings;
   a control device actuating opening and closing of said at least two closing elements in order to selectively open or close a correlated second outlet opening or second inlet opening;
   wherein each of said at least two closing elements is adjustable continuously by said control device between a maximum open position and a closed position in which it is forced onto a seat and in this way blocks said fluid flow;
   wherein said control device comprises:
      at least one moveable or rotatable cam as a cam disk having at least two cam paths arranged on an axial face of said cam disk that are each correlated to adjust respective closing elements to continuously adjust said respective closing elements as said rotatable cam disk rotates;
   wherein said at least two closing elements are each secured to a follower pin each riding on a respective cam path adjusting said at least two closing elements;
   wherein movement or rotation of said rotatable cam adjusting said at least two closing elements is realized by an actuator.

2. The control valve unit for a liquid circuit according to claim 1, wherein
   geometry of said at least two closing elements is designed such that the force of the static and of the dynamic pressure exerted liquid flowing onto said at least two closing elements acts to urge said at least two closing elements into their closed position.

3. The control valve unit for a liquid circuit according to claim 2, wherein
said at least two closing elements each have a respective one of said follower pin secured to both axial sides of said at least two closing elements;
wherein said follower pins on each axial side are slideably mounted into a respect one to two guide bearings;
wherein said guide bearings are fixedly mounted to the housing;
wherein in at least one of these guide bearings radial play between said guide pin and a respective one of said guide bearings is provided;
wherein said play compensates alignment deviations of said follower pin or orientation errors of said seat;
wherein said cam is comprised of a cam disk that is caused to rotate by said actuator;
wherein a measuring device detecting an actual measured position of said cam or said at least two closing elements, said measuring device providing a signal for correcting an actual measured cam or closing element position to a desired cam or closing element position through said actuator;
wherein said measuring device comprises
at least one Hall sensor; and
at least one corresponding magnet arranged on any of said cam, follower pin, or drive shaft.

4. The control valve unit for a liquid circuit according to claim 1, wherein
said cam is comprised of a cam disk that is caused to rotate by said actuator.

5. The control valve unit for a liquid circuit according to claim 1, wherein
said housing of said control valve unit is mounted by a flange directly onto an engine block or a cylinder head of the internal combustion engine;
wherein said first opening immediately corresponds with an outlet opening or inlet opening of the counter flange on the engine block or cylinder head;
wherein liquid flows directly without an additional connecting piece between the internal combustion engine and the control valve unit.

6. The control valve unit for a liquid circuit according to claim 1, wherein
at least one of said at least two closing elements includes a fail-safe function provided in such a way that it assumes a predetermined closed or open position in case of a malfunction of the control valve unit or of the internal combustion engine.

7. The control valve unit for a liquid circuit according to claim 1, wherein
liquid flows from said first inlet opening arranged immediately in front of said at least two closing elements and then into separate second outlet openings downstream of the closing elements; or
liquid flows from separate ones of said at least two second inlet openings arranged upstream of said at least two closing elements then into a common first outlet opening immediately downstream of said at least two closing elements.

8. The control valve unit for a liquid circuit according to claim 1, wherein
said control valve unit is arranged upstream of the internal combustion engine relative to the liquid flowing through.

9. The control valve unit for a liquid circuit according to claim 1, wherein
at least one of said at least two cam paths of the control device are adjustable relative to each other; or/and
at least one of said at least two cam paths can be decoupled for deactivation of at least one of said at least two closing elements for changing the control behavior of said at least two closing elements relative to the cam.

10. The control valve unit for a liquid circuit according to claim 1, wherein
said control device in an actuating direction of said at least two closing elements is adjustably supported;
whereby spacing and thus flow cross-section between said seat and a corresponding one of said at least two closing elements changes.

11. The control valve unit for a liquid circuit according to claim 1, wherein
said control valve unit comprises
a temperature sensor; and
a control device is provided that, when the at least two closing devices are closed, the control device temporarily opens at least one of said at least two closing elements in intervals in order to supply liquid from the liquid circuit to of the temperature sensor to provide a temperature measurement during the actual closed position of the closing elements.

12. A control valve unit for controlling fluid flow in a liquid circuit of an internal combustion engine, comprising:
a valve housing including
at least one first inlet opening or first outlet opening for the fluid flow;
at least two second outlet openings or at least two second inlet openings;
at least two closing elements arranged in the valve housing, axially movable and operable to close off the fluid flow between said first opening and said second openings;
a control device actuating opening and closing of said at least two closing elements in order to selectively open or close a correlated second outlet opening or second inlet opening;
wherein each of said at least two closing elements is adjustable continuously by said control device between a maximum open position and a closed position in which it is forced onto a seat and in this way blocks said fluid flow;
wherein said control device comprises
at least one moveable or rotatable cam as a cam disk having at least two cam paths arranged on an axial face of said cam disk that are each correlated to adjust respective closing elements to continuously adjust said respective closing elements as said rotatable cam disk rotates;
wherein said at least two closing elements are each secured to a follower pin each riding on a respective cam path adjusting said at least two closing elements;
wherein movement or rotation of said rotatable cam adjusting said at least two closing elements is realized by an actuator;
wherein said at least two closing elements each have a respective one of said follower pin secured to both axial sides of said at least two closing elements;
wherein said follower pins on each axial side are slideably mounted into a respect one to two guide bearings;
wherein said guide bearings are fixedly mounted to the housing;
wherein in a respective one of said guide bearings, said guide pin is received with side to side radial play into said respective one of said guide bearings, said side to side radial play providing side to side compensation of alignment deviations of said follower pin or compensation of orientation errors of said closing element on said seat.

13. A control valve unit for controlling fluid flow in a liquid circuit of an internal combustion engine, comprising:
a valve housing, including
at least one first inlet opening or first outlet opening for the fluid flow;
at least two second outlet openings or at least two second inlet openings;
at least two closing elements arranged in the valve housing, axially movable and operable to close off the fluid flow between said first opening and said second openings;
a control device actuating opening and closing of said at least two closing elements in order to selectively open or close a correlated second outlet opening or second inlet opening;
wherein each of said at least two closing elements is adjustable continuously by said control device between a maximum open position and a closed position in which it is forced onto a seat and in this way blocks said fluid flow;
wherein said control device comprises:
at least one moveable or rotatable cam as a cam disk having at least two cam paths arranged on an axial face of said cam disk that are each correlated to adjust respective closing elements to continuously adjust said respective closing elements as said rotatable cam disk rotates;
wherein said at least two closing elements are each secured to a follower pin each riding on a respective cam path adjusting said at least two closing elements;
wherein movement or rotation of said rotatable cam adjusting said at least two closing elements is realized by an actuator;
a measuring device detecting an actual measured position of said cam disk or said at least two closing elements, said measuring device providing a signal for correcting an actual measured cam or closing element position to a desired cam or closing element position through said actuator;
wherein said measuring device comprises
at least one Hall sensor; and
at least one corresponding magnet arranged on any of said cam, follower pin, or drive shaft;
wherein said magnet is arranged in fluid flowing through an interior of the control valve unit;
said Hall sensor is arranged away from and separated by a wall from fluid flow in said control valve unit.

* * * * *